United States Patent
Ma et al.

(10) Patent No.: US 9,775,152 B2
(45) Date of Patent: Sep. 26, 2017

(54) METHOD AND BASE STATION FOR DATA TRANSMISSION

(71) Applicant: Huawei Technologies Co., Ltd., Shenzhen, Guangdong (CN)

(72) Inventors: Haitao Ma, Shanghai (CN); Yun Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 14/754,893

(22) Filed: Jun. 30, 2015

(65) Prior Publication Data

US 2015/0305033 A1    Oct. 22, 2015

Related U.S. Application Data

(63) Continuation of application No. PCT/CN2012/088130, filed on Dec. 31, 2012.

(51) Int. Cl.
*H04W 72/04* (2009.01)
*H04W 56/00* (2009.01)
*H04W 88/08* (2009.01)

(52) U.S. Cl.
CPC ....... *H04W 72/0446* (2013.01); *H04W 56/00* (2013.01); *H04W 56/0045* (2013.01); *H04W 88/08* (2013.01)

(58) Field of Classification Search
None
See application file for complete search history.

(56) References Cited

U.S. PATENT DOCUMENTS

| 2009/0204862 A1* | 8/2009 | Chun | H04L 1/1822 714/748 |
| 2009/0298524 A1* | 12/2009 | Kuo | H04L 1/1874 455/509 |
| 2010/0296454 A1* | 11/2010 | Park | H04L 1/1812 370/328 |

(Continued)

FOREIGN PATENT DOCUMENTS

| CN | 101346906 A | 1/2009 |
| CN | 101772150 A | 7/2010 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.0.0, Sep. 2012, 55 pages.

*Primary Examiner* — Eunsook Choi

(57) ABSTRACT

A method and a base station for data transmission are disclosed. The data transmission method includes: when a semi-persistent resource is in an activated state and time alignment (TA) data needs to be sent, sending the TA data to a user equipment (UE) by using the semi-persistent resource. In embodiments of the present application, the base station sends the TA data by using the semi-persistent resource, thereby reasonably using the resource and reducing scheduling and allocation of PDCCH and PDSCH resources by the base station. This not only saves resources, but also reduces time that the base station takes to process TA data, and increases system resource utilization and cell throughput.

4 Claims, 5 Drawing Sheets

(56) References Cited

U.S. PATENT DOCUMENTS

| | | | | |
|---|---|---|---|---|
| 2012/0257513 A1* | 10/2012 | Yamada | ............... | H04L 1/0618 370/248 |
| 2013/0142175 A1* | 6/2013 | Manssour | ......... | H04W 72/1252 370/336 |
| 2013/0315149 A1* | 11/2013 | Park | .................. | H04L 1/1812 370/328 |
| 2014/0106774 A1* | 4/2014 | Siomina | ............... | H04W 64/00 455/456.1 |
| 2015/0312957 A1* | 10/2015 | Pelletier | ............... | H04W 74/04 370/329 |
| 2016/0227522 A1* | 8/2016 | Dinan | .................... | H04L 1/00 |

FOREIGN PATENT DOCUMENTS

| | | |
|---|---|---|
| CN | 101772159 A | 7/2010 |
| CN | 101827439 A | 9/2010 |
| CN | 102231917 A | 11/2011 |
| CN | 102763468 A | 10/2012 |
| CN | 102781073 A | 11/2012 |
| EP | 2 131 624 A1 | 12/2009 |
| EP | 2131517 A2 | 12/2009 |
| WO | WO 2012/134071 A2 | 10/2012 |
| WO | 2013/080159 A1 | 6/2013 |

\* cited by examiner

METHOD AND BASE STATION FOR DATA TRANSMISSION

CROSS-REFERENCE TO RELATED APPLICATIONS

This application is a continuation of International Application No. PCT/CN2012/088130, filed on Dec. 31, 2012, which is hereby incorporated by reference in its entirety.

TECHNICAL FIELD

The present application relates to the field of communications technologies, and in particular, to a method and a base station for data transmission.

BACKGROUND

In a radio communications system, uplink time alignment (uplink TA) needs to be maintained after access of a user equipment (UE). An evolved Node B (eNodeB) configures an information element TimeAlignmentTimer (time alignment timer) for the UE by using radio resource control (RRC) signaling. Before the TimeAlignmentTimer times out, if the UE does not receive TA (time alignment) data, such as a TA MCE (MAC Control Element, media access control information element), sent by the eNodeB, uplink out-of-synchronization may occur on the UE.

In the prior art, when sending the TA data to the UE, the eNodeB needs to allocate physical downlink control channel (PDCCH) and physical downlink shared channel (PDSCH) resources. In addition, to ensure that the UE is free of uplink out-of-synchronization, the eNodeB needs to send the TA data to the UE periodically or upon an event trigger (when the eNodeB measures that TA needs to be adjusted) before the TimeAlignmentTimer times out, and it needs to schedule and allocate the PDCCH and PDSCH resources during each sending. This method consumes a lot of system resources and increases processing time of the eNodeB.

SUMMARY

Embodiments of the present application provide a method and a base station for data transmission, which can reduce consumption of system resources and processing time of a base station.

To resolve the foregoing technical problems, the embodiments of the present application disclose the following technical solutions:

According to a first aspect, a data transmission method is provided, including: when a semi-persistent resource is in an activated state and time alignment (TA) data needs to be sent, sending the TA data to a user equipment (UE) by using the semi-persistent resource.

With reference to the first aspect, in a first possible implementation, the sending the TA data to a UE by using the semi-persistent resource includes:

forming the TA data and semi-persistent data into a data packet; and sending the data packet to the UE by using the semi-persistent resource.

With reference to the first possible implementation of the first aspect, in a second possible implementation, the forming the TA data and semi-persistent data into a data packet includes:

forming the TA data and the semi-persistent data into the data packet when a difference between a size of a semi-persistently scheduled transport block and a size of a media access control packet data unit is greater than or equal to a size of the TA data.

According to a second aspect, a uplink time alignment method is provided, including:

receiving a data packet by using a semi-persistent resource, where the data packet includes time alignment (TA) data;

obtaining the TA data from the data packet; and performing uplink time alignment according to the TA data.

According to a third aspect, a data transmission apparatus is provided, including:

a scheduling unit, configured to periodically enable a semi-persistent resource to be in an activated state; and a processing unit, configured to, when the semi-persistent resource is in the activated state and time alignment (TA) data needs to be sent, send the TA data to a user equipment (UE) by using the semi-persistent resource.

With reference to the third aspect, in a first possible implementation, the processing unit includes:

a packet forming subunit, configured to form TA data and semi-persistent data into a data packet when the semi-persistent resource is in the activated state and the time alignment (TA) data needs to be sent; and a sending subunit, configured to send the data packet to the UE by using the semi-persistent resource.

With reference to the first possible implementation of the third aspect, in a second possible implementation, the packet forming subunit is specifically configured to form the TA data and the semi-persistent data into the data packet when a difference between a size of a semi-persistently scheduled transport block and a size of a media access control packet data unit is greater than or equal to a size of the TA data.

According to a fourth aspect, an uplink time alignment apparatus is provided, including:

a data packet receiving unit, configured to receive a data packet by using a semi-persistent resource, where the data packet includes time alignment (TA) data;

a data obtaining unit, configured to obtain the TA data from the data packet; and a time alignment unit, configured to perform uplink time alignment according to the TA data.

According to a fifth aspect, a base station is provided, including:

a transceiver apparatus; and a processor connected to the transceiver apparatus, configured to, when a semi-persistent resource is in an activated state and time alignment (TA) data needs to be sent, send the TA data to a user equipment (UE) by using the transceiver apparatus and the semi-persistent resource.

According to a sixth aspect, a terminal is provided, including:

a transceiver apparatus, configured to receive a data packet by using a semi-persistent resource, where the data packet includes time alignment (TA) data; and a processor connected to the transceiver apparatus, configured to obtain the TA data from the data packet, and perform uplink time alignment according to the TA data.

In the embodiments of the present application, a base station sends TA data by using a semi-persistent resource, thereby reasonably using the resource and reducing scheduling and allocation of PDCCH and PDSCH resources by the base station. This not only saves resources, but also reduces time that the base station takes to process TA data, and increases system resource utilization and cell throughput.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

To make a person skilled in the art better understand the technical solutions in the embodiments of the present application, and to make the objectives, features, and advantages of the embodiments of the present application more obvious and comprehensible, the following further describes the technical solutions in the embodiments of the present application in detail with reference to the accompanying drawings.

Figure 1:
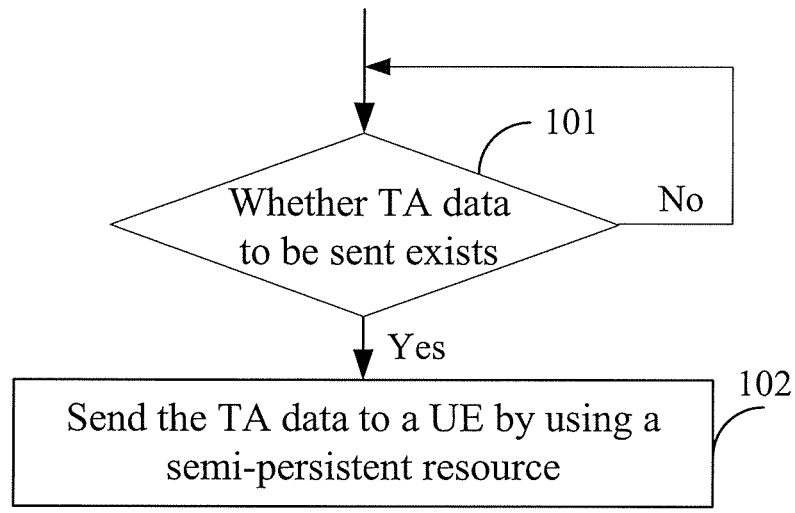
FIG. 1 is a flowchart of a data transmission method according to an embodiment of the present application.

Refer to FIG. 1, which is a flowchart of a data transmission method according to an embodiment of the present application. The method is used for transmitting TA data, which, for example, may be a TA MCE. The method is executed by a base station, for example, an eNodeB.

As shown in FIG. 1, the method may include the following steps:

Step 101: When a semi-persistent resource is in an activated state, monitor whether TA data needs to be sent; when TA data needs to be sent, perform step 102.

Step 102: Send the TA data to a UE by using the semi-persistent resource.

That is, the data transmission method according to this embodiment includes: when a semi-persistent resource is in an activated state and TA data needs to be sent, sending the TA data to a UE by using the semi-persistent resource.

Semi-persistent scheduling refers to that a base station pre-allocates a UE a scheduling resource, for example, information such as the number of resource blocks (RB), an RB position, and a scheduling order, and arranges with the UE about a scheduling period. In each scheduling period, the base station may send downlink data to the UE, so that the UE can obtain the downlink data by using the pre-allocated resource. It is similar for uplink. For the uplink, the UE sends data to the base station by using a pre-allocated resource. The scheduling period may be called a semi-persistent scheduling period, and generally may be configured by using Radio Resource Control (RRC) protocol signaling. The activated state in which the semi-persistent resource is refers to a state in which the base station may send downlink data by using the pre-allocated resource when a semi-persistent scheduling period reaches.

Evidently, in this embodiment of the present application, when the semi-persistent scheduling is activated (that is, a semi-persistent resource is in an activated state), a manner of carrying TA data to be sent is used to effectively reduce PDCCH and PDCCH resources required for scheduling the TA data, thereby reducing time that the base station takes to process TA dynamic scheduling and increasing system resource utilization and cell throughput.

According to the foregoing description, the semi-persistent scheduling is periodical. Therefore, when TA data needs to be sent, a semi-persistent resource may be in an activated state, and may also be in an unactivated state. When the TA data needs to be sent and the semi-persistent resource is in the activated state, a manner of scheduling the TA data in the embodiment shown in FIG. 1 may be used directly. When the TA data needs to be sent and the semi-persistent resource is in the unactivated state, dynamic resource scheduling may be performed according to an existing manner to send the TA data. Alternatively, before a TimeAlignmentTimer times out, the embodiment shown in FIG. 1 may also be used to schedule the TA data after a certain time until a semi-persistent scheduling period reaches; otherwise, the TA data is sent still according to the existing manner.

Figure 2:
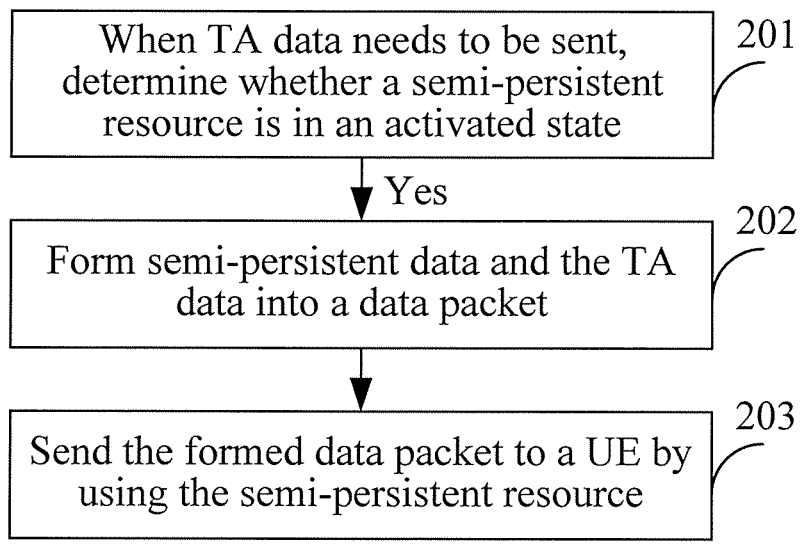
FIG. 2 is a flowchart of another data transmission method according to an embodiment of the present application.

Refer to FIG. 2, which is a flowchart of another data transmission method according to an embodiment of the present application. As shown in FIG. 2, the method may include the following steps:

Step 201: When TA data needs to be sent, determine whether a semi-persistent resource is in an activated state.

This step may be executed by a base station. After access of a UE, when needing to send the TA data to the UE, the base station may first determine whether the semi-persistent resource is in the activated state (if the base station has sent a PDCCH to the UE to activate downlink semi-persistent scheduling, the semi-persistent resource is in the activated state). The TA data is data used by the UE to perform uplink time alignment.

When it is determined that the semi-persistent resource is in the activated state, a next step is performed. Otherwise, the base station may perform dynamic resource scheduling according to an existing manner and then send the TA data. Certainly, before a TimeAlignmentTimer times out, the next step may also be performed after a certain time until the semi-persistent resource is in the activated state; otherwise, the TA data is sent still according to the existing manner.

Step 202: Form semi-persistent data and the TA data into a data packet.

Step 203: Send, to the UE by using the semi-persistent resource, the data packet formed in step 202.

After the data packet formed by the semi-persistent data and the TA data is generated, the base station sends the data packet to the UE by using the semi-persistent resource.

In this embodiment of the present application, a base station sends TA data by using a semi-persistent resource, thereby reasonably using the resource and preventing the base station from scheduling and allocating PDCCH and PDSCH resources. This not only saves resources, but also reduces time that the base station takes to process TA data, and increases system resource utilization and cell throughput.

Figure 3:
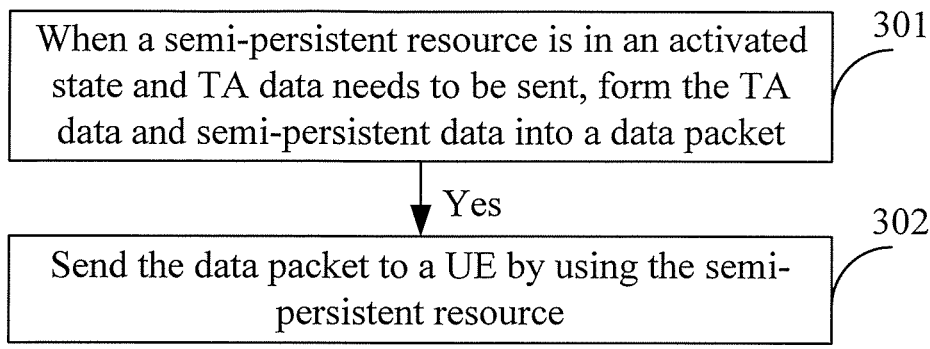
FIG. 3 is a flowchart of another data transmission method according to an embodiment of the present application.

The TA data is small packet data; for example, a TA MCE is generally of only 2 bytes. Therefore, the TA data and the semi-persistent data that originally needs to be scheduled may be sent in a formed packet. For ease of description, in this embodiment of the present application, the semi-persistent data that originally needs to be scheduled is simply called the semi-persistent data. Therefore, the semi-persistent data in this embodiment of the present application refers to downlink data that originally needs to be sent and does not carry the TA. Refer to FIG. 3, which is a flowchart of another data transmission method according to an embodiment of the present application. As shown in FIG. 3, the method may include the following steps:

Step 301: When a semi-persistent resource is in an activated state and TA data needs to be sent, form the TA data and semi-persistent data into a data packet.

Step 302: Send the data packet to a UE by using the semi-persistent resource.

In this embodiment, a process of forming a data packet may be implemented in a manner of inserting TA data into a transport block (TB) or in another manner, as long as that the semi-persistent data and the TA data can be sent to a UE by using a semi-persistent resource.

Generally, a TB size (TB size, for example, the number of bytes in a TB) allocated by a base station for the semi-persistent data is large enough, and an idle field may be reserved therein. The TA data is of a relatively small size, for example, of only 2 bytes. Therefore, the base station can generate a data packet by directly combining the TA data and the semi-persistent data.

In another embodiment, it may also be first determined whether there are enough remaining resources before a data packet is formed, so as to ensure that TA data can be inserted into semi-persistent data. For example, during semi-persistent activation, if it is found that a UE has TA data that needs to be scheduled, and a difference between a TB size for scheduling and a size of a media access control (MAC) packet data unit (PDU) is greater than or equal to 2 bytes, the semi-persistent data and the TA data are sent together in a formed packet this time. Otherwise, dynamic resource scheduling may be performed according to an existing manner.

Figure 4:
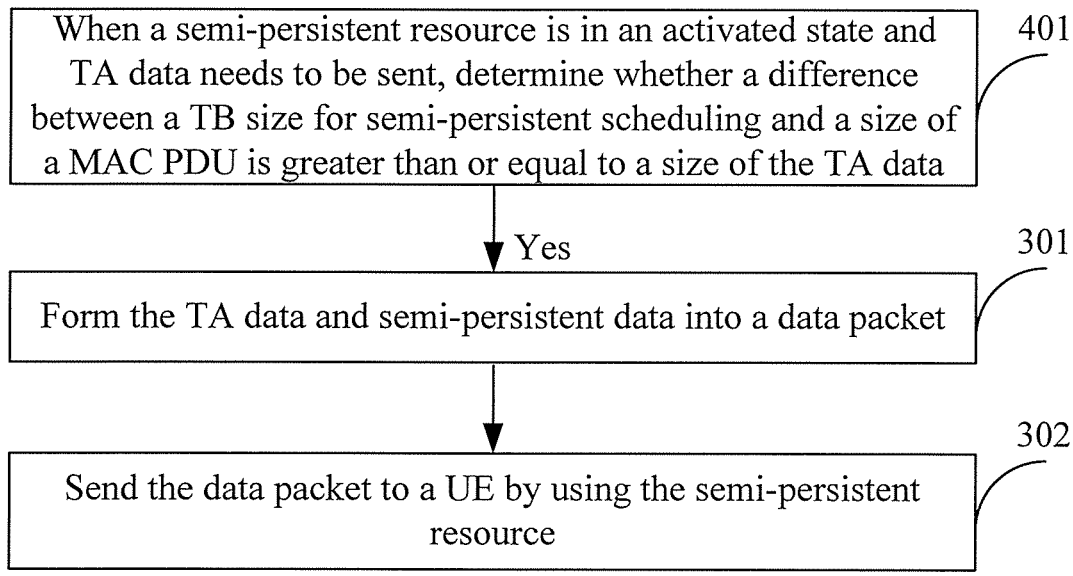
FIG. 4 is a flowchart of another data transmission method according to an embodiment of the present application.

Refer to FIG. 4, which is a flowchart of another data transmission method according to an embodiment of the present application. As shown in FIG. 4, compared with the embodiment shown in FIG. 3, when a semi-persistent resource is in an activated state and TA data needs to be sent, before step 301 of forming the TA data and semi-persistent data into a data packet, the method further includes the following step:

Step 401: Determine whether a difference between a TB size for semi-persistent scheduling and a size of a MAC PDU is greater than or equal to a size of the TA data; if yes, perform step 301.

For example, in the foregoing step 401, it is determined whether a difference between the number of bytes of a transport block allocated for the semi-persistent data and the number of bytes of the semi-persistent data is greater than or equal to the number of bytes (for example, 2 bytes) of the TA data; if yes, the semi-persistent data and the TA data are formed into a data packet.

Certainly, when the semi-persistent resource is in an activated state, perhaps no semi-persistent data needs to be scheduled. Therefore, in this case, the TA data may be sent by directly using the semi-persistent resource. Alternatively, before a TimeAlignmentTimer times out, the TA data may be sent after there is semi-persistent data that needs to be scheduled; in this way, resources can be saved.

Figure 5:
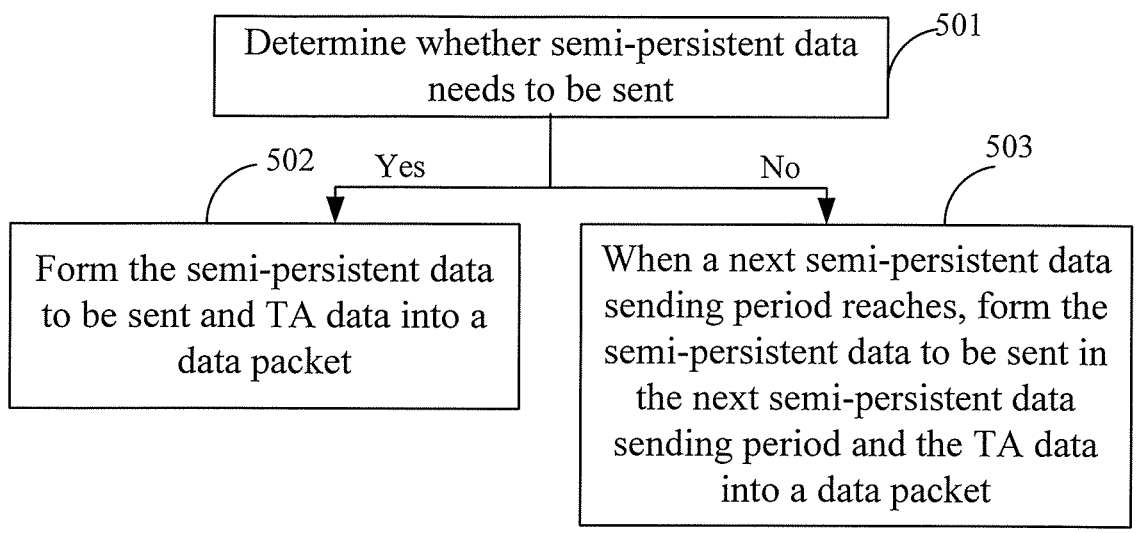
FIG. 5 is a flowchart of another data transmission method according to an embodiment of the present application.

Refer to FIG. 5, which is a flowchart of another data transmission method according to an embodiment of the present application. In this embodiment, as shown in FIG. 5, when a semi-persistent resource is in an activated state and TA data needs to be sent, the method may include the following steps:

Step 501: Determine whether semi-persistent data to be sent exists.

Because semi-persistent data is periodically sent, before the TA data and the semi-persistent data are formed into a data packet, it may be first determined whether currently semi-persistent data to be sent exists. If currently the semi-persistent data to be sent exists, step 502 is performed; if no semi-persistent data exists, step 503 may be performed.

Step 502: Form the semi-persistent data to be sent and the TA data into a data packet.

Step 503: When a next semi-persistent data sending period reaches, form the semi-persistent data to be sent in the next semi-persistent data sending period and the TA data into a data packet.

A process of forming the data packet in step 502 and step 503 may be inserting the TA data into an idle field of a data packet of the semi-persistent data.

In another embodiment, it may also be determined, before step 502 or step 503, whether a difference between a TB size for semi-persistent scheduling and a size of a MAC PDU is greater than or equal to a size of the TA data. If yes, the semi-persistent data to be sent and the TA data are then formed into a data packet. The semi-persistent data to be sent may be the semi-persistent data currently to be sent in step 502, and may also be the semi-persistent data to be sent in the next semi-persistent data sending period in step 503.

Figure 6:
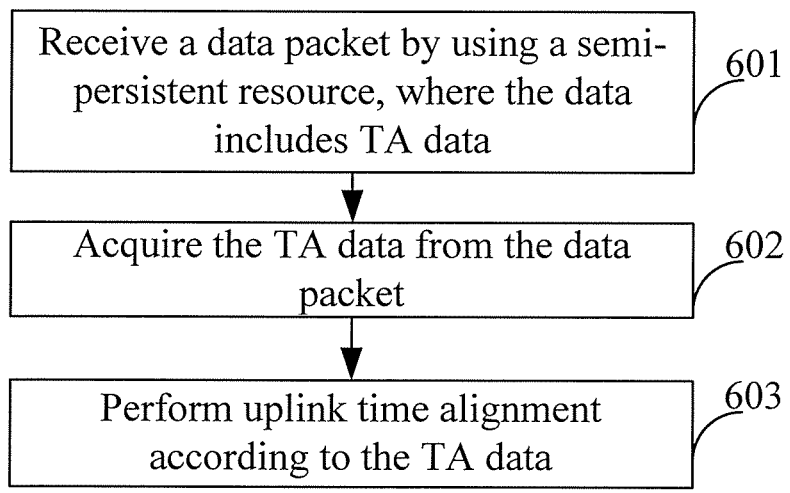
FIG. 6 is a flowchart of an uplink time alignment method according to an embodiment of the present application.

Refer to FIG. 6, which is a flowchart of an uplink time alignment method according to an embodiment of the present application.

In this embodiment, the method is executed by a terminal, and the method may include the following steps:

Step 601: Receive a data packet by using a semi-persistent resource, where the data packet includes TA data.

If the semi-persistent resource is activated, a base station first sends the TA data to a UE by using the semi-persistent resource.

After receiving the data packet by using the semi-persistent resource, the UE performs a next step.

Step 602: Obtain the TA data from the data packet.

Step 603: Perform uplink time alignment according to the TA data.

A process of performing uplink time alignment by the UE according to the TA data is the same as that in the prior art, and therefore no further details are described herein.

In this embodiment of the present application, a UE obtains TA data by using a semi-persistent resource, thereby reasonably using the resource and reducing scheduling and allocation of PDCCH and PDSCH resources by a base station. This not only saves resources, but also reduces time that the base station takes to process TA data, and increases system resource utilization and cell throughput.

The foregoing describes the method embodiments of the present application, and the following describes apparatuses for implementing the foregoing methods.

Figure 7:
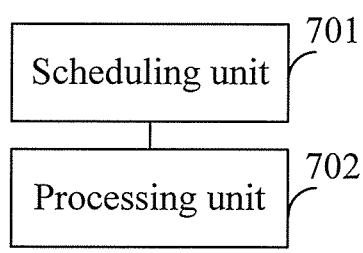
FIG. 7 is a schematic structural diagram of a data transmission apparatus according to an embodiment of the present application.

Refer to FIG. 7, which is a schematic structural diagram of a data transmission apparatus according to an embodiment of the present application.

The apparatus may include:

a scheduling unit 701, configured to periodically enable a semi-persistent resource to be in an activated state; and a processing unit 702, configured to, when the semi-persistent resource is in the activated state and time alignment (TA) data needs to be sent, send the TA data to a user equipment (UE) by using the semi-persistent resource.

In this embodiment of the present application, TA data is sent by using the foregoing units and a semi-persistent resource, thereby reasonably using the resource and reducing scheduling and allocation of PDCCH and PDSCH resources by a base station. This not only saves resources, but also reduces time that the base station takes to process TA data, and increases system resource utilization and cell throughput.

Figure 8:
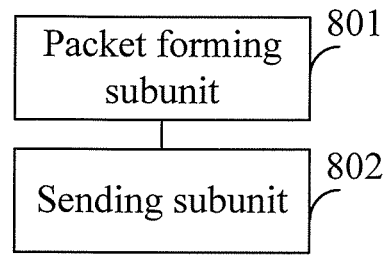
FIG. 8 is a schematic structural diagram of a processing unit of a data transmission apparatus according to an embodiment of the present application.

In another embodiment of the present application, as shown in FIG. 8, the processing unit of the apparatus may further include:

a packet forming subunit 801, configured to form the TA data and semi-persistent data into a data packet when the semi-persistent resource is in the activated state and the time alignment (TA) data needs to be sent; and a sending subunit 802, configured to send the data packet to the UE by using the semi-persistent resource.

The packet forming subunit 801 may be specifically configured to form the TA data and the semi-persistent data into the data packet when a difference between a size of a semi-persistently scheduled transport block and a size of a media access control packet data unit is greater than or equal to a size of the TA data.

Figure 9:
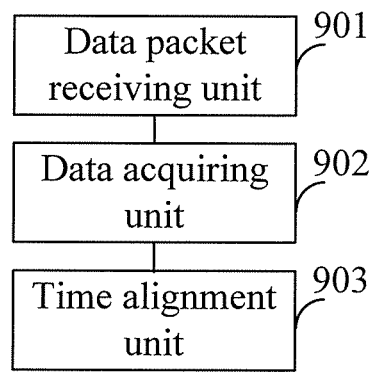
FIG. 9 is a schematic structural diagram of an uplink time alignment apparatus according to an embodiment of the present application.

Refer to FIG. 9, which is a schematic structural diagram of an uplink time alignment apparatus according to an embodiment of the present application.

The apparatus may include:

a data packet receiving unit 901, configured to receive a data packet by using a semi-persistent resource, where the data packet includes time alignment (TA) data;

a data obtaining unit 902, configured to obtain the TA data from the data packet; and a time alignment unit 903, configured to perform uplink time alignment according to the TA data.

In this embodiment of the present application, TA MCE data is obtained by using the foregoing unit and a semi-persistent resource, thereby reasonably using the resource and reducing scheduling and allocation of PDCCH and PDSCH resources by a base station. This not only saves resources, but also reduces time that the base station takes to process TA data, and increases system resource utilization and cell throughput.

Figure 10:
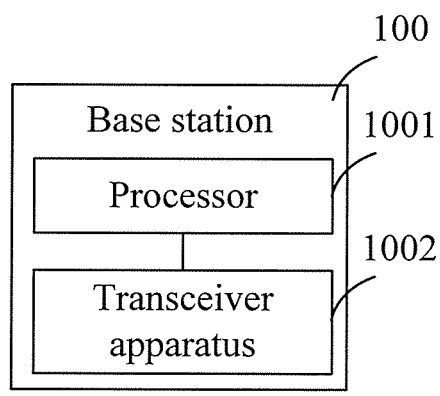
FIG. 10 is a schematic structural diagram of a base station according to an embodiment of the present application.

Refer to FIG. 10, which is a schematic structural diagram of a base station according to an embodiment of the present application.

The base station 100 may include a processor 1001 and a transceiver apparatus 1002.

The processor 1001 is connected to the transceiver apparatus 1002 and is configured to, when a semi-persistent resource is in an activated state and time alignment (TA) data needs to be sent, send the TA data to a user equipment (UE) by using the transceiver apparatus 1002 and the semi-persistent resource.

The base station sends TA MCE data by using the semi-persistent resource, thereby reasonably using the resource and reducing scheduling and allocation of PDCCH and PDSCH resources by the base station. This not only saves resources, but also reduces time that the base station takes to process TA data, and increases system resource utilization and cell throughput.

Figure 11:
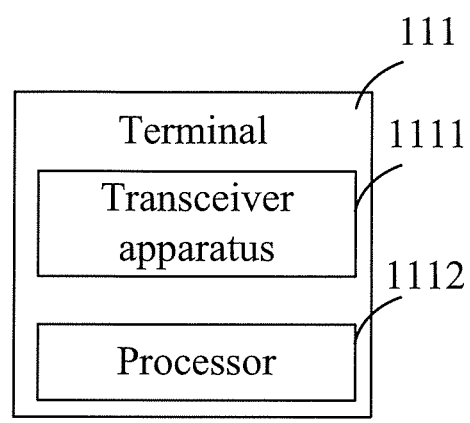
FIG. 11 is a schematic structural diagram of a terminal according to an embodiment of the present application.

Refer to FIG. 11, which is a schematic structural diagram of a terminal according to an embodiment of the present application.

The terminal 111 may include a transceiver apparatus 1111 and a processor 1112.

The transceiver apparatus 1111 is configured to receive a data packet by using a semi-persistent resource, where the data packet includes time alignment (TA) data.

The processor 1112 is connected to the transceiver apparatus 1111 and is configured to obtain the TA data from the data packet, and perform uplink time alignment according to the TA data.

The terminal obtains TA MCE data by using the semi-persistent resource, thereby reasonably using the resource and reducing scheduling and allocation of PDCCH and PDSCH resources by a base station. This not only saves resources, but also reduces time that the base station takes to process TA data, and increases system resource utilization and cell throughput.

An embodiment of the present application further provides a computer program product, including a computer readable medium, where the computer readable medium includes a set of program code, which is used to perform:

when a semi-persistent resource is in an activated state and time alignment (TA) data needs to be sent, sending the TA data to a user equipment (UE) by using the semi-persistent resource.

The sending the TA data to a UE by using the semi-persistent resource includes:

forming the TA data and semi-persistent data into a data packet; and sending the data packet to the UE by using the semi-persistent resource.

The forming the TA data and semi-persistent data into a data packet includes: forming the TA data and the semi-persistent data into the data packet when a difference between a size of a semi-persistently scheduled transport block and a size of a media access control packet data unit is greater than or equal to a size of the TA data.

An embodiment of the present application further provides a computer program product, including a computer readable medium, where the computer readable medium includes a set of program code, which is used to perform:

receiving a data packet by using a semi-persistent resource, where the data packet includes time alignment (TA) data;

obtaining the TA data from the data packet; and performing uplink time alignment according to the TA data.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor to perform all or a part of the steps of the methods described in the embodiments of the present application. The foregoing storage medium includes: any mediums that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the appended claims.

What is claimed is:

1. A data transmission method, comprising:
when a semi-persistent resource is in an activated state and time alignment (TA) data needs to be sent, sending, by a base station, the TA data to a user equipment (UE) by using the semi-persistent resource;
wherein sending, by the base station, the TA data to the UE by using the semi-persistent resource comprises:
forming, by the base station, the TA data and semi-persistent data into a data packet; and
sending, by the base station, the data packet to the UE by using the semi-persistent resource;
wherein forming, by the base station, the TA data and semi-persistent data into the data packet comprises:
forming, by the base station, the TA data and the semi-persistent data into the data packet when a difference between a size of a semi-persistently scheduled transport block and a size of a media access control packet data unit (MAC PDU) is greater than or equal to a size of the TA data.

2. An uplink time alignment method, comprising:
receiving, by a user equipment (UE), a data packet by using a semi-persistent resource, wherein the data packet is formed by a base station and comprises time alignment (TA) data and semi-persistent data, wherein the data packet is formed by the base station when a difference between a size of a semi-persistently scheduled transport block and a size of a media access control packet data unit (MAC PDU) is greater than or equal to a size of the TA data;
obtaining, by the UE, the TA data from the data packet; and
performing, by the UE, uplink time alignment according to the TA data.

3. A base station, comprising:
a transceiver apparatus; and
a processor connected to the transceiver apparatus, the processor configured to, when a semi-persistent resource is in an activated state and time alignment (TA) data needs to be sent, send the TA data to a user equipment (UE) by using the transceiver apparatus and the semi-persistent resource, wherein the processor is configured to:
form the TA data and semi-persistent data into a data packet when a difference between a size of a semi-persistently scheduled transport block and a size of a media access control packet data unit (MAC PDU) is greater than or equal to a size of the TA data; and
send the data packet to the UE by using the semi-persistent resource.

4. A terminal, comprising:
a transceiver apparatus, configured to receive a data packet by using a semi-persistent resource, wherein the data packet is formed by a base station and comprises time alignment (TA) data and semi-persistent data, wherein the data packet is formed by the base station when a difference between a size of a semi-persistently scheduled transport block and a size of a media access control packet data unit (MAC PDU) is greater than or equal to a size of the TA data; and
a processor connected to the transceiver apparatus, the processor configured to obtain the TA data from the data packet, and perform uplink time alignment according to the TA data.

* * * * *